United States Patent
Howard

Patent Number: 5,774,255
Date of Patent: Jun. 30, 1998

[54] ADAPTIVE INFRARED MODULATOR

[75] Inventor: Bruce M. Howard, Gilbert, Ariz.

[73] Assignee: McDonnell Douglas Corporation, Huntington Beach, Calif.

[21] Appl. No.: 717,758

[22] Filed: Sep. 23, 1996

[51] Int. Cl.$^6$ ..................................................... G02F 1/153
[52] U.S. Cl. ............................................................. 359/267
[58] Field of Search ...................................... 359/265, 267

[56] References Cited

U.S. PATENT DOCUMENTS

| | | | |
|---|---|---|---|
| 3,153,113 | 10/1964 | Flanagan et al. | |
| 4,538,158 | 8/1985 | Warszawski | 346/135.1 |
| 4,571,029 | 2/1986 | Skotheim et al. | 350/357 |
| 4,573,768 | 3/1986 | Polak et al. | 350/357 |
| 4,596,635 | 6/1986 | Warszawski | 204/2 |
| 4,596,722 | 6/1986 | Warszawski | 427/108 |
| 4,598,979 | 7/1986 | Sugiuchi et al. | 350/357 |
| 4,618,218 | 10/1986 | Shaw et al. | 350/363 |
| 4,645,307 | 2/1987 | Miyamoto et al. | 350/357 |
| 4,938,571 | 7/1990 | Cogan et al. | 359/275 |
| 5,054,894 | 10/1991 | Warszawski | 359/270 |
| 5,056,899 | 10/1991 | Warszawski | 350/357 |
| 5,074,648 | 12/1991 | Warszawski | 359/265 |
| 5,078,480 | 1/1992 | Warszawski | 359/265 |
| 5,080,470 | 1/1992 | Warszawski | 359/265 |
| 5,082,355 | 1/1992 | Warszawski | 359/265 |
| 5,293,546 | 3/1994 | Tadros et al. | 359/269 |
| 5,321,544 | 6/1994 | Parkhe et al. | 359/275 |
| 5,384,653 | 1/1995 | Benson et al. | 359/265 |
| 5,418,640 | 5/1995 | Hood | 359/265 |
| 5,419,854 | 5/1995 | Wakabayashi et al. | 259/265 |

*Primary Examiner*—Georgia Y. Epps
*Assistant Examiner*—Thomas Robbins
*Attorney, Agent, or Firm*—Harness, Dougherty & Pierce, P.L.C.

[57] ABSTRACT

A reversible electrodeposition electrochromic infrared modulator for modulating infrared energy is provided. The modulator includes a working electrode having an infrared transparent substrate with first and second major surfaces. A conductive layer is disposed on the second major surface of the substrate. A counter electrode is spaced from the working electrode and a sealing assembly hermetically seals the working and counter electrodes with a cavity defined therebetween. An electrolyte material containing an electrochromic material is disposed within the cavity. A reversible power source is coupled to the working and the counter electrodes for providing a reversible voltage potential between the working and the counter electrodes. A thin film of the electrochromic material plates the conductive layer of the working electrode in response to an on state voltage potential between the working and the counter electrodes. The film of the electrochromic material increases the reflectance of infrared energy incident upon the first major surface of the infrared transparent substrate.

19 Claims, 2 Drawing Sheets

ADAPTIVE INFRARED MODULATOR

BACKGROUND OF THE INVENTION

1. Technical Field

The present invention relates to thermal control utilizing reversible electrodeposition (RED) electrochromic materials and devices and, more particularly, to a RED electrochromic modulator with increased performance in modulating infrared reflectance by the deposition and stripping of a thin metal film on an electrode electrochemically and reversibly.

2. Discussion

Thermal control of spacecraft is a difficult problem given the extreme temperature fluctuations in a day-night cycle in space and the need to reject heat from onboard equipment. Spacecraft have limited operating temperature windows that are driven by the subcomponents contained on the spacecraft. For example, a spacecraft's fluid systems only operate within specific temperature ranges due to the nature of the system's chemical compounds. Hydrazine, a common propellant, freezes at about 1.4° C. (35° F.) and begins to chemically decompose at 35° C. (95° F). Similarly, solid state electronic devices used to control spacecraft power systems, among others, are sensitive to high temperature excursions. Failure rates begin to increase in such devices at temperatures as low as 40° C. (104° F.).

Typically, spacecraft thermal control is generally provided by radiators that reject internally generated heat into space. A radiator's surfaces commonly have optical properties that provide high solar reflectance and high infrared emittance. A problem with such a passive approach is that the radiator's performance is fixed while operating conditions are varying. The result is that the radiator temperature tends to drop under less than worst case conditions. Currently, this problem is solved by using heaters or louvers. Heaters provide make up heat when the spacecraft temperature drops and louvers are used to vary both the radiator emittance and solar absorptance. Unfortunately, these thermal control methods have drawbacks such as weight, power, and mechanical complexity.

Electrochromic materials have generated considerable interest in recent years because of their potential application in smart windows, flat panel displays, and variable emissivity devices. Electrochromic materials reversibly change color as a function of applied electric current and fall into two categories. The first are ion insertion materials, where thin electrochromic films attached to transparent conductive substrates are switched by the simultaneous insertion (or ejection) of ions and electrons into the material. The second are reversible electrodeposition (RED) materials where thin films are repeatedly plated and stripped from a transparent conductive substrate, resulting in light modulation. To date, the majority of electrochromic materials research, including that aimed at producing an infrared modulator, has been focused on ion insertion materials such as tungstic oxide ($WO_3$). However, ion insertion materials exhibit significant drawbacks limiting their utility including slow switching speeds and short cycle lifetimes.

It is therefore desirable to provide a reversible electrodeposition electrochromic device with improved infrared light modulation performance.

More particularly, it is desirable to provide a reversible electrodeposition electrochromic modulator used to control thermal infrared properties of a radiator employed in a space environment.

SUMMARY OF INVENTION

In accordance with the teachings of the present invention, a reversible electrodeposition electrochromic infrared modulator for modulating infrared energy is provided. The modulator includes a working electrode having an infrared transparent substrate with first and second major surfaces. A conductive layer is disposed on the second major surface of the substrate. A counter electrode is spaced from the working electrode and a sealing assembly hermetically seals the working and counter electrodes with a cavity defined therebetween. An electrolyte material containing an electrochromic material is disposed within the cavity. A reversible power source is coupled to the working and the counter electrodes for providing a reversible voltage potential between the working and the counter electrodes. A thin film of the electrochromic material plates the conductive layer of the working electrode in response to an on state voltage potential between the working and the counter electrodes. The film of the electrochromic material increases the reflectance of infrared energy incident upon the first major surface of the infrared transparent substrate.

In accordance with a preferred embodiment, the modulator includes a plurality of conductive grid patterns formed on the conductive layer to increase the conductivity of the working electrode.

In accordance with another preferred embodiment, an antireflection coating is disposed on the first major surface of the transparent substrate to reduce reflection of energy incident thereon having a predetermined wavelength.

BRIEF DESCRIPTION OF THE DRAWINGS

The various advantages of the present invention will become apparent to those skilled in the art after reading the following specification and by reference to the drawings in which.

DETAILED DESCRIPTION OF THE PREFERRED EMBODIMENTS

The following description of the preferred embodiments is merely a exemplary in nature and is in no way intended to limit the invention or its application or uses.

The present invention utilizes an electrochromic process to control thermal infrared properties. A desirable solution for spacecraft thermal control is to cover thermal radiators with an electro-emissive surface, that is, a surface that varies its emissivity with an applied voltage or current. Electrochromic (EC) materials with variable infrared reflectance (and hence variable emissivity) are ideal for spacecraft thermal control applications. Electrochromic devices such as reversible electrodeposition (RED) electrochromic modulators can make major advances in reflective light modulation for the above application area. The use of reversible electrodeposition of metals is a major improvement over ion insertion type electrochromics such as tungsten trioxide electrochromics. The present invention may also be utilized to control heat rejection from commercial and residential buildings.

Figure 1:
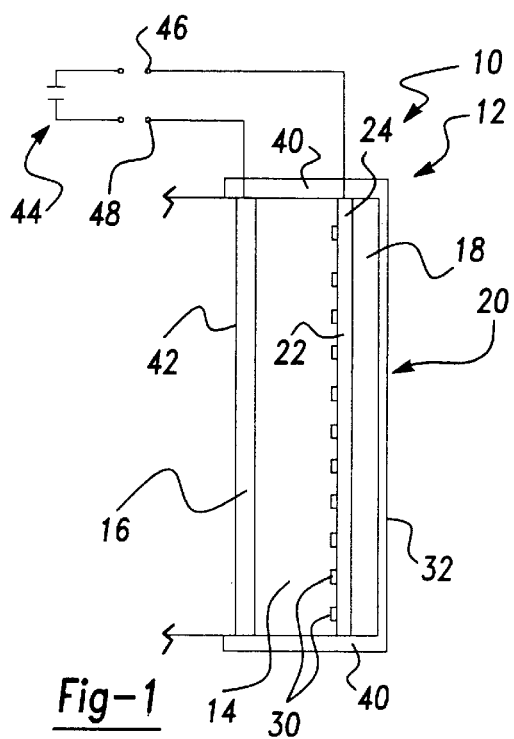
FIG. 1 is a view of a reversible electrodeposition (RED) electrochromic device in accordance with the teachings of the present invention.

Turning to FIG. 1, a reversible electrodeposition (RED) electrochromic infrared modulator 10 is shown. The modulator 10 includes three distinct layers: a transparent conducting working electrode 12, a gel electrolyte material 14 containing electrochromic materials, and a counter electrode 16. The working electrode 12 consists of an infrared transparent substrate 18 having a first major surface 20 and a second major surface 22. The substrate 18 is formed from a material such as zinc sulfide (ZnS), zinc selenide (ZnSe), or combination of the two, IR transparent glasses, silicon, sapphire, polyethylene or any other IR transparent material. The substrate 18 has a conductive layer 24 disposed on the second major surface 20. The conductive layer 24 is indium tin oxide. However, other metal oxide and metallic coatings may be used with a relatively high surface resistivity (>100 ohms/square) to allow infrared transmission and provide charge conduction. The conductivity of the working electrode 12 is further enhanced by the inclusion of square grid patterns 30 of a noble metal such as platinum, palladium, gold, or other metal or alloy which is inert to the electrochemical reactions. The first major surface 20 of the substrate 18 is treated with an antireflection coating 32 suitable to reduce energy reflection over a desired operating wavelength. The counter electrode 16 is spaced from the working electrode 12 and is composed of an electrical conductor which can be carbon, metal, or semiconductor materials. The electrodes 12 and 16 can be either rigid or flexible, providing design flexibility. Additionally, the counter electrode 16 can be transparent or opaque.

The modulator 10 is hermetically sealed by a sealing assembly 40 which may be a metallic or polymer to prevent water evaporation and damage from outside materials. The modulator 10 is attached to an outside surface of a thermal radiator 42 to provide thermal control for a spacecraft (not shown). The performance of the electrochromic modulator 10 is controlled by a reversible power source 44 which controls the current and voltage at leads 46 and 48 which, in turn, are coupled to the working and the counter electrodes 12 and 16.

Figure 2:
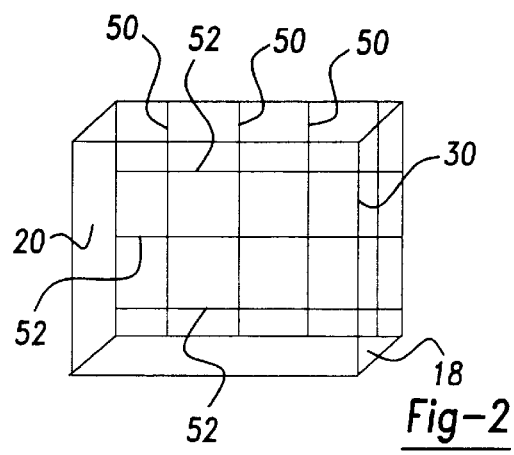
FIG. 2 is an enlarged view of a square grid pattern formed on a working electrode of the RED electrochromic modulator in accordance with the teachings of the present invention.

FIG. 2 further illustrates the structure of the metal grid patterns 30 as viewed through the first major surface 20 of the substrate 18. The metal grid pattern 30 includes conductive vertically aligned members 50 and intersecting horizontal members 52 that are electrically conductive. The vertical and horizontal members 50 and 52 are aligned in a square grid pattern. As will be apparent to one skilled in the art, additional or less conductive members 50 and 52 may be employed for a particular application in order to control the specific conductivity of the working electrode 12.

A generalized cell reaction for the electrolyte material 14 is presented in Equation 1:

$$(3n)X^- + 2M^{n+} = 2M^0 + (n)X_3^-  \quad (1)$$

where M denotes a metal that is reversibly electroplated, X is a halogen atom, and n is the oxidation number of the metal cation. The electrochromic system represented in Equation 1 thus employs two reversible redox couples, $M^{n+}/M^0$ and $X_3^-/X^-$. The $X_3^-/X^-$ counter electrode redox couple plays the important role of preventing electrolyte decomposition in the system. The electrolyte material 14 contains the chemical species indicated in equation 1 above plus water, a gel forming material, a surfactant, a buffer material, and an ion conductor. In accordance with a preferred embodiment, the electrochromic material within electrolyte material 14 is nickel (Ni). However, one skilled in the art will realize that silver (Ag) or any other electrodepositable metal may be used.

The electrochromic modulator 10 can be assembled simply by sandwiching the electrolyte 14 between the working and counter electrodes 12 and 16. Electrical contact is made to the electrodes 12 and 16 through the leads 46 and 48, and the whole assembly is then sealed via sealing assembly 40 to provide environmental integrity.

In operation, the power source 44 supplies an on state voltage potential of −1.0 volts between the working and counter electrodes 12 and 16 such that the electrochromic material within the electrolyte material 14 begins to plate the conductive layer 24. As a result, the reflectance of infrared energy incident upon the first major surface 20 of the substrate 18 is increased. The thickness of the plating of the electrochromic material increases as a function of the length of time that the on state voltage potential is applied. Conversely, when the reversible power source 44 reverses the voltage potential to +1.0 volts between the leads 46 and 48, the electrochromic material is stripped from the conductive layer 24 such that the reflectance of the infrared energy is decreased. As such, the modulator 10 modulates the infrared energy incident upon its first major surface 20.

The modulation of optical properties by reversible metal electrodeposition is rapid when compared to other electrochromic processes. Depending on the formulation, switching times ranging from 30 ms to a few seconds have been demonstrated. The reflectance of the modulator 10 (and hence emissivity) is controlled via the thickness of the metallic deposit of the electrochromic material on the conductive layer 24. This is accomplished in practice by controlling the number of coulombs utilized in the electrochromic reaction (see Equation 1). As the deposit grows from a thin film to a thick film, the infrared reflectance of the modulator 10 is enhanced. By varying the thickness of the metallic deposit on the conductive layer 24, a continuous change in reflectance is observed and thus emissivity is controlled. The modulator 10 thereby modulates the amount of infrared energy absorbed by the electrolyte 14 and the radiator 42. As such, when the power supply 44 is in an off state, i.e. 0 volts between leads 46 and 48, the modulator 10 absorbs infrared energy which is used to heat the radiator 42. Likewise, when the on state voltage potential appears between the leads 46 and 48, the modulator 10 reflects the infrared energy thereby reducing the absorbed infrared energy.

Figure 3:
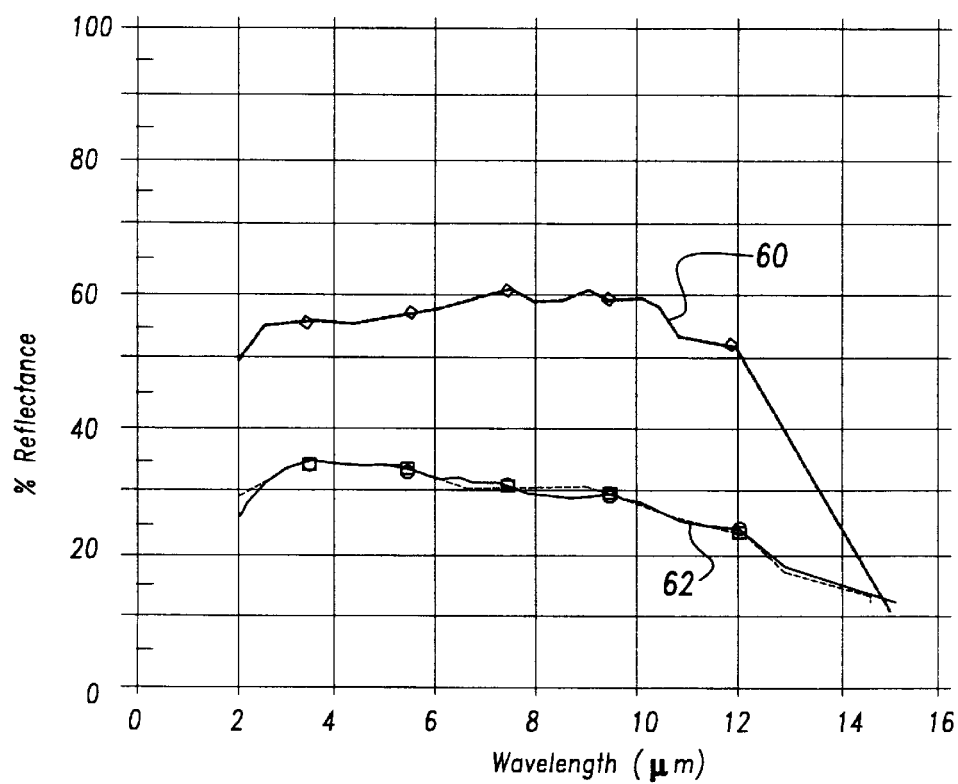
FIG. 3 is a graph illustrating the reflectance performance of the RED electrochromic modulator with and without an anti-reflection coating disposed on the working electrode, as a function of the wavelength of received energy in accordance with the teachings of the present invention.

FIG. 3 illustrates the performance (percent reflectance vs. wavelength) of the infrared modulator 10 on a zinc sulfide substrate 18 without the antireflection coating 32 based upon the electrodeposition of nickel (Ni). The modulator 10 has a reflectance modulation of 30%, from about 30 to 60% in the 8–12 μm wavelength region without the antireflection coating 32, and 35% to 55% in the 2–8 μm region. The off (unplated) state is represented by plot 60. The on (Nickel plated) state is indicated by the plot 62. As illustrated, beyond 12 μm, the zinc sulfide substrate 18 begins to absorb infrared radiation such that its transparency is reduced and the reflectance is reduced.

Figure 4:
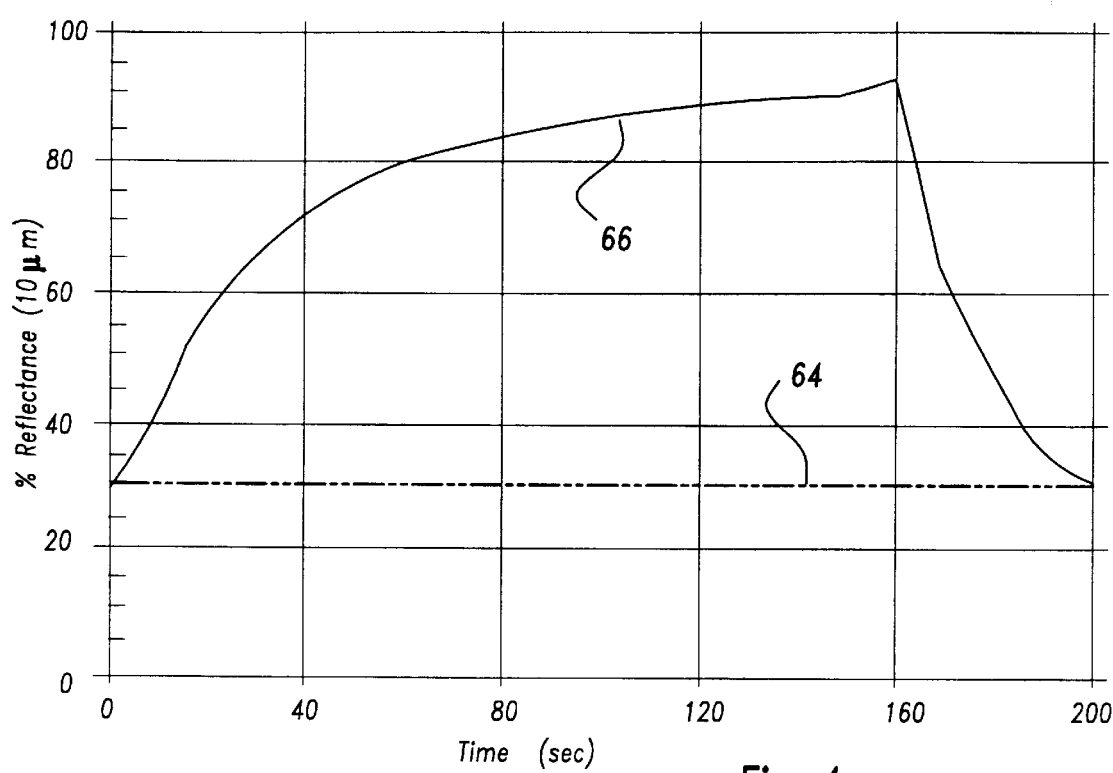
FIG. 4 is a graph illustrating the reflectance performance of the RED electrochromic modulator with the antireflection coating, as a function of time during on and off voltage states in accordance with the teachings of the present invention.

FIG. 4 illustrates the performance of the nickel RED electrochromic infrared modulator 10 with the antireflection coating 32 at a wavelength of 10 μm during a slow write. The graph illustrates the infrared reflectance change as a function of write and erase time for a slow write and erase cycle. The plot 64 is the reflectance when the modulator 10 is off (0 volts). The plot 66 illustrates the increase in reflectance as the nickel is plated (−1.0 volts) on the substrate 18. At point 68 the modulator 10 starts to be erased (+1.0 volts), i.e. the nickel is stripped from the conductive layer 24. The reflectance modulation has increased to approximately 50% across the band, an improvement of about 20% over that shown in FIG. 3. The modulator 10 modulates IR radiation quite well and is conveniently formulated into tapes that can be laminated onto IR transparent substrates.

Figure 5:
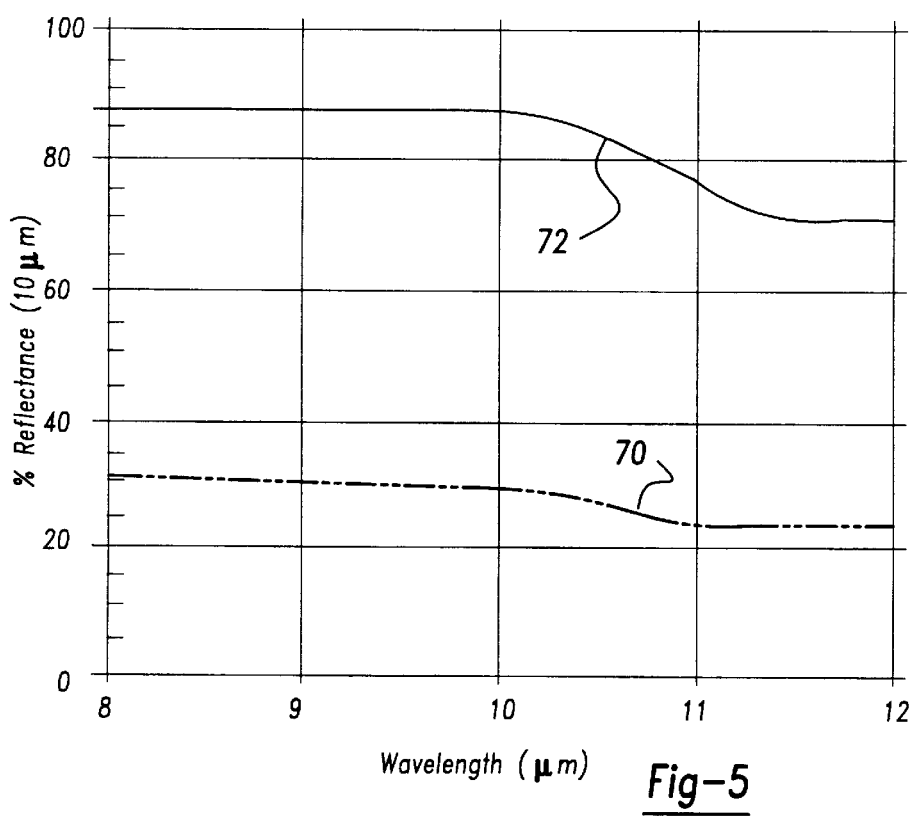
FIG. 5 is a graph illustrating the reflectance performance of the RED electrochromic device as a function of the wavelength of received energy during the on and off voltage states in accordance with the present invention.

FIG. 5 illustrates the 8–12 μm performance the reflectance change in the on and off states over the entire 8–12 μm region of the modulator 10. Plot 70 illustrates the off state (unplated) spectral performance and plot 72 illustrates the on state (plated) performance.

Reversible electrodeposition electrochromic infrared modulators based on silver (Ag) have also been demonstrated. The infrared reflectance of silver is well known in the infrared industry and it is commonly used in infrared mirrors. Infrared modulators based on silver provides a reflectance in the 8–12 μm band of more than 80% in the plated state and 20% in the non-plated state.

From the foregoing, it can be seen that reversible electrodeposition electrochromic devices are excellent candidates for variable reflectance (emittance) device applications. The reversible electrodeposition modulator can modulate infrared reflectance from about 30% to 87% in the 8–12 μm wavelength region with an antireflective coating.

The foregoing discloses and describes merely exemplary embodiments of the present invention. One skilled in the art will readily recognize from such discussion, and from the accompanying drawings and claims, that various changes, modifications and variations can be made therein without departing from the spirit and scope of the present invention as defined by the following claims.

What is claimed is:

1. A reversible electrodeposition electrochromic infrared modulator system for a spacecraft, comprising:

a) a thermal radiator associated with a spacecraft; and
   b) an electrochromic modulator thermally connected to said thermal radiator, said modulator including:
      a working electrode including an infrared transparent substrate having a first major surface, a second major surface, and a conductive layer disposed on the second major surface of the substrate;
      a counter electrode spaced from the working electrode;
      a sealing assembly for hermetically sealing the working and the counter electrodes with a cavity defined therebetween;
      a gel electrolyte material disposed within the cavity, the gel electrochromic material including a reversible electrodeposition material; and
      a reversible power source coupled to the working and the counter electrodes for providing a reversible voltage potential between the working and the counter electrodes, whereby a film of the electrochromic material plates the conductive layer in response to an on state voltage potential between the working and the counter electrodes such that reflectance of infrared energy incident on the first major surface of the substrate is increased;

the system exhibiting a reflectance modulation of:
      (i) about 30% to 60% in the 8–12 μm wavelength region; and
      (ii) about 35% to 55% in the 2–8 μm wavelength region.

2. The system of claim 1, further comprising:
   a plurality of conductive grid patterns disposed throughout the conductive layer, whereby the conductive grid patterns increase the conductivity of the working electrode.

3. The system of claim 2, wherein the conductive grid patterns are formed from a noble metal.

4. The system of claim 1, wherein each of the conductive grid patterns includes a plurality of intersecting horizontally and vertically aligned conductive members.

5. The system of claim 1, further comprising:
   an antireflection coating disposed on the first major surface of the working electrode for reducing reflection of the energy incident on the first major surface over a predetermined wavelength;
   the system exhibiting a reflectance modulation of from about 30% to 87% in the 8–12 μm wavelength region.

6. The system of claim 5, wherein a reflectance modulation of about 80%, at about 10 μm wavelength, occurs in about 70 seconds.

7. The system of claim 1, wherein the electrochromic material includes nickel.

8. The system of claim 1, wherein the infrared transparent substrate is formed from a material selected from the group consisting of zinc sulfide (ZnS), zinc selenide (ZnSe), infrared transparent glass, silicon, sapphire, polyethylene and mixtures thereof.

9. The system of claim 1, wherein the conductive layer is indium tin oxide.

10. A reversible electrodeposition electrochromic infrared modulator for thermally connecting with a thermal radiator of a spacecraft, comprising:
    a working electrode including an infrared transparent substrate having a first major surface, a second major surface, and a conductive layer disposed on the second major surface of the substrate;
    a plurality of conductive grid patterns disposed throughout the conductive layer for increasing the conductivity of the working electrode;
    an antireflection coating disposed on the first major surface of the working electrode for reducing reflection of received energy over a predetermined wavelength;
    a counter electrode spaced from the working electrode;
    a sealing assembly for hermetically sealing the working and the counter electrode with a cavity defined therebetween;
    an electrolyte material disposed within the cavity, the electrolyte material containing an electrochromic material including a reversible electrodeposition material; and
    a reversible power source coupled to the working and the counter electrodes for providing a reversible voltage potential between the working and the counter electrodes, whereby a film of the electrochromic material plates the conductive layer in response to an on state voltage potential between the working and counter electrodes such that reflectance of infrared energy incident on the first major surface of the substrate is increased and whereby the film of the electrochromic material is stripped from the conductive layer in response to reversed voltage potential between the working and counter electrodes such that the reflectance of the infrared energy is decreased;

said modulator exhibiting a reflectance modulation of:
(i) about 30% to 60% in the 8–12 μm wavelength region; and
(ii) about 35% to 55% in the 2–8 μm wavelength region.

11. The modulator of claim 10, wherein each of the conductive grid patterns includes a plurality of intersecting horizontally and vertically aligned conductive members.

12. The modulator of claim 10, wherein the conductive grid pattern members are formed from a noble metal.

13. The modulator of claim 10, wherein the electrochromic material includes nickel.

14. The modulator of claim 10, wherein the infrared transparent substrate is formed from a material selected from the group consisting of zinc sulfide (ZnS), zinc selenide (ZnSe), infrared transparent glass, silicon, sapphire, polyethylene and mixtures thereof.

15. The modulator of claim 10, wherein the conductive layer is indium tin oxide.

16. A thermal control system, comprising:

a thermal radiator associated with a spacecraft for controlling thermal operating conditions of the spacecraft;

a reversible electrodeposition electrochromic infrared modulator disposed on an outer surface of the radiator, the modulator including:
(a) a working electrode including an infrared transparent substrate having a first major surface, a second major surface, and a conductive layer disposed on the second major surface of the substrate;
the infrared transparent substrate being formed from a material selected from the group consisting of zinc sulfide (ZnS), zinc selenide (ZnSe), infrared transparent glass, silicon, sapphire, polyethylene and mixtures thereof;
(b) a plurality of conductive grid patterns disposed throughout the conductive layer, whereby the conductive grid patterns increase the conductivity of the working electrode;
(c) an antireflection coating disposed on the first major surface of the working electrode for reducing reflection of the energy incident on the first major surface over a predetermined wavelength;
(d) a counter electrode spaced from the working electrode;
(e) a sealing assembly for hermetically sealing the working and the counter electrode with a cavity defined therebetween;
(f) a gel electrolyte material disposed within the cavity, the gel electrolyte material containing an electrochromic material incorporating nickel for reversible electrodeposition; and
(g) a reversible power source coupled to the working and the counter electrodes for providing a reversible voltage potential between the working and the counter electrodes, whereby a film of the electrochromic material plates the conductive layer in response to an on state voltage potential between the working and the counter electrodes such that reflectance of infrared energy incident on the first major surface of the substrate is increased;

the system exhibiting a reflectance modulation of:
(i) about 30% to 60% in the 8–12 μm wavelength region; and
(ii) about 35% to 55% in the 2–8 μm wavelength region.

17. The system of claim 16, wherein the infrared transparent substrate is zinc sulfide.

18. The system of claim 16, wherein the system exhibits a reflectance modulation of from about 30% to 87% in the 8–12 μm wavelength region.

19. The system of claim 18, wherein a reflectance modulation of about 80%, at about 10 μm wavelength, occurs in about 70 seconds.

* * * * *